May 26, 1931. G. R. PENNINGTON 1,807,133
BELT DRIVE MECHANISM
Original Filed Feb. 7, 1923 3 Sheets-Sheet 2
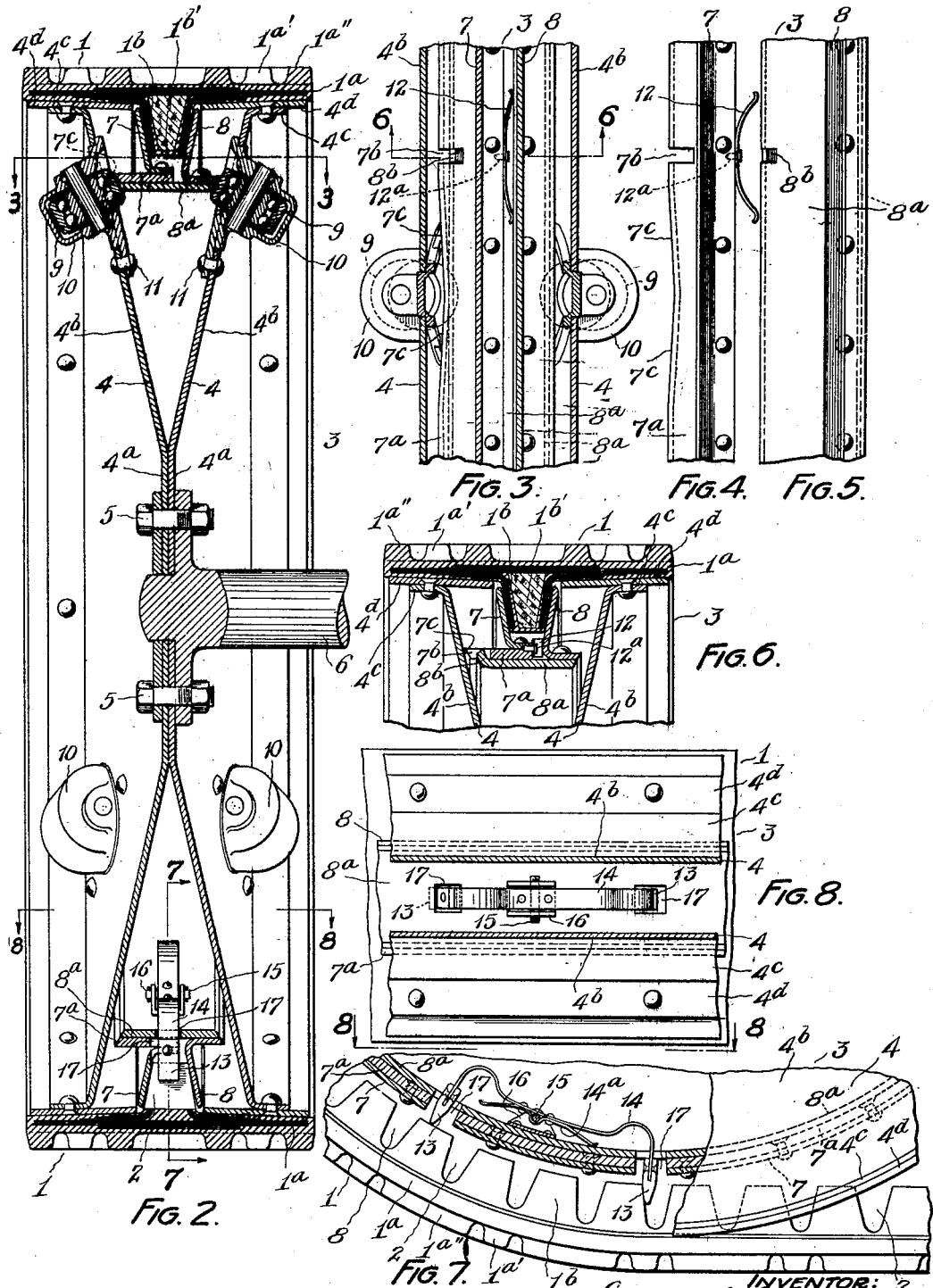

May 26, 1931. G. R. PENNINGTON 1,807,133
BELT DRIVE MECHANISM
Original Filed Feb. 7, 1923    3 Sheets-Sheet 3
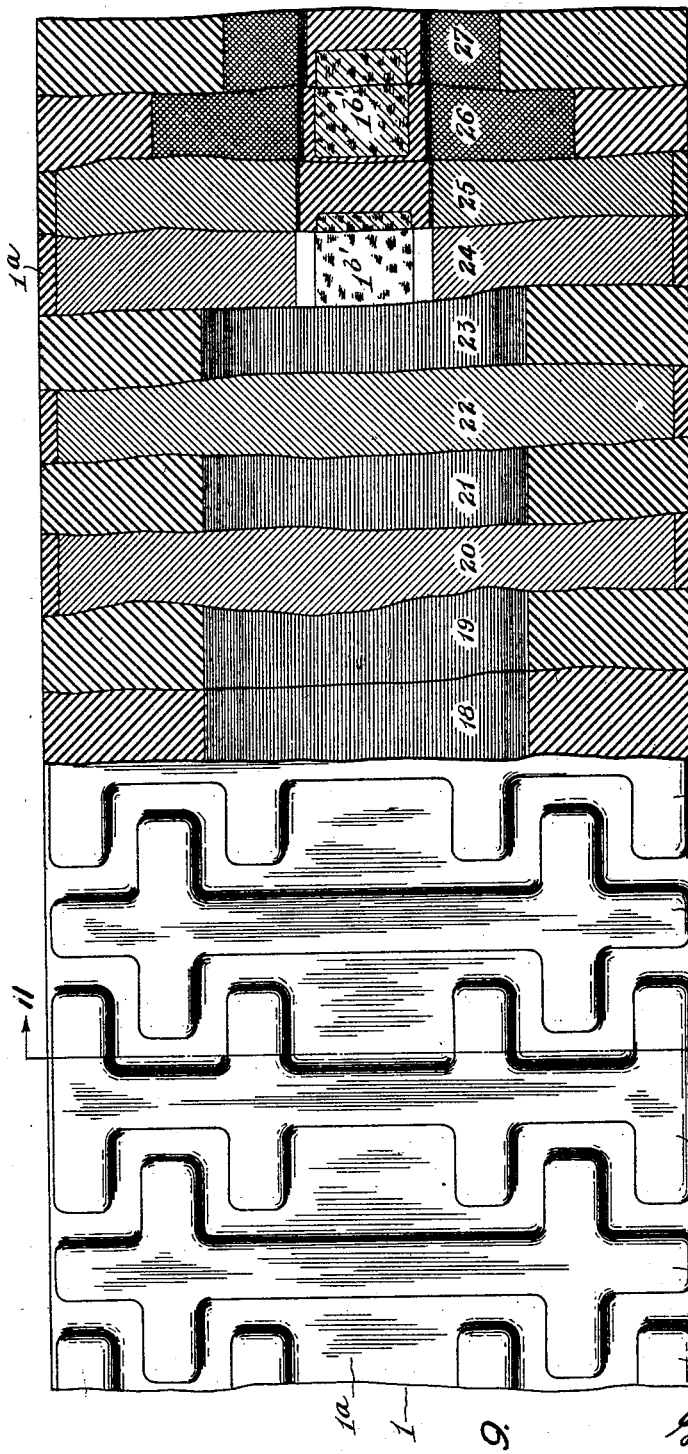
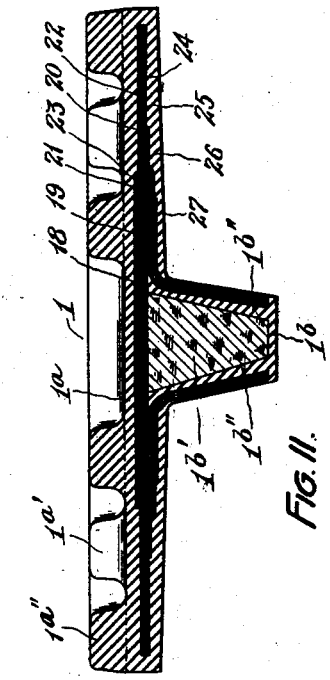
INVENTOR
Gordon R. Pennington
BY
ATTORNEY Patented May 26, 1931

1,807,133

UNITED STATES PATENT OFFICE

GORDON R. PENNINGTON, OF CLEVELAND HEIGHTS, OHIO

BELT DRIVE MECHANISM

Application filed February 7, 1923, Serial No. 617,431. Renewed March 21, 1929.

This invention relates to belt drive mechanism for transmitting power by frictional engagement of a belt and a driving or driven wheel. The invention is especially useful in connection with endless belt traction mechanism of motor vehicles where the belt constitutes the track upon which the vehicle wheels run and by engagement with which the vehicle is driven.

The invention has for one of its objects the provision of a belt-gripping wheel that is light in weight, strong, reliable in operation and susceptible of being produced at moderate cost.

Another object of the invention is to provide a wheel with a belt-gripping mechanism that is positively actuated by the relative slipping of the belt and the wheel.

Another object of the invention is to provide mechanism of the character in question in which the belt gripping mechanism is automatically restored to its non-gripping condition when slippage between the wheel and belt does not occur, thus helping to insure reliable operation and at the same time facilitating engagement and disengagement of the belt with the wheel.

Another object of the invention is the provision of a belt-gripping wheel having its peripheral tread parts rigidly connected to the wheel axle or part which drives the wheel or is driven by it, thus securing a strong rugged construction.

Another object of the invention is the provision of a wheel having belt-drive mechanism that is independent of the tread sections of the wheel.

Other objects more or less incidental to the foregoing, and the preferred manner of attaining the various objects will be pointed out in the following description in connection with the accompanying drawings.

In the drawings, Fig. 1 is a side elevation of a wheel and belt mechanism embodying my invention.

Fig. 2 is an enlarged section on the line 2—2, Fig. 1.

Fig. 3 is a fragmentary sectional development, the section being taken on the line 3—3, Fig. 2.

Fig. 4 is a fragmentary development of one of the belt-gripping rings.

Fig. 5 is a similar view of the other belt-gripping ring.

Fig. 6 is a section on the line 6—6, Fig. 3.

Fig. 7 is a section on the line 7—7, Fig. 2.

Fig. 8 is a plan section on the line 8—8, Fig. 7.

Fig. 9 is an enlarged plan of a portion of the belt showing the tread and with parts of the structure cut away to disclose the internal construction.

Fig. 10 is an enlarged side elevation of a portion of the belt.

Fig. 11 is a section on the line 11—11, Fig. 9.

Figure 1:
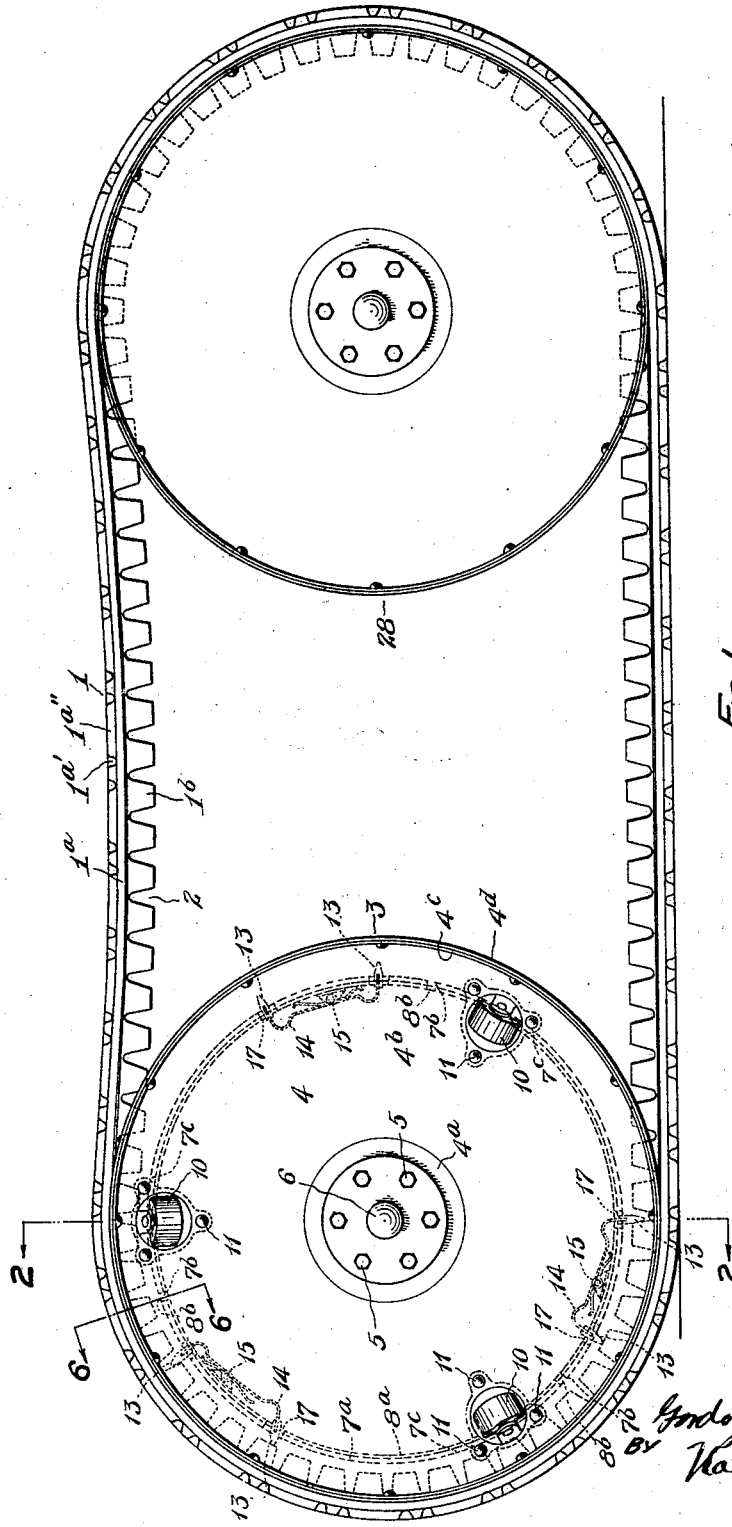

Referring now in detail to the construction illustrated, 1 indicates a flexible track belt formed with a web or tread section $1a$ and a longitudinal central rib $1b$ on the inner side of the web $1a$, said rib being formed with the notches 2 to permit the web of the belt to flex readily and for a further purpose which will presently appear. The belt is made of rubber preferably with fabric reinforcement of both the web and rib parts, and the rib sections are preferably also provided with cores of cork or the like. A further description of the belt construction will be given presently.

The belt 1 passes around the driving wheel which is designated in its entirety by the numeral 3. In the construction illustrated, the driving wheel comprises a pair of pressed metal discs 4, 4 which at their inner peripheries are rigidly secured by bolts 5, 5 to the flange of the driving axle 6. The discs 4 have inner parts $4a$, $4a$ disposed at right angles to the wheel axis intermediate divergent parts $4b$, $4b$ and outer laterally extending flanges $4c$, 4c. To the flanges 4c are riveted laterally extending rims 4d, 4d. The parts 4a and 4b constitute the body of the wheel, while the rim sections 4d, 4d which are rigidly connected with the wheel body have outer tread surfaces that engage the inner side of the belt 1.

Between the divergent webs 4b, 4b of the wheel body are arranged a pair of rings 7 and 8 which are formed with opposite, inclined lateral surfaces adapted to frictionally engage the lateral surfaces of the rib 1b of the belt. The ring 7 has riveted to it a circumferentially extending band or flange 7a which fits on the outer side of a similarly arranged band 8a riveted to the ring 8. The two ring structures when assembled are operatively supported upon a plurality of anti-friction rollers 9, 9 which engage the beveled edges of band 8a and are mounted in cast housings 10, 10, rigidly secured, as by rivets 11 to the web sections 4b of the wheel discs. The rollers 9 are preferably mounted on ball bearings, as shown in Fig. 2. The band 7a is formed with a notch 7b and the bind 8a is formed with a struck-up lug 8b (Figs. 4, 5 and 6) which engages the notch 7b and thus prevents relative rotational movement of the two rings while permitting lateral movement of ring 7 relative to ring 8. The band 7a is recessed adjacent each pair of rollers 9 to form oppositely inclined cam surfaces 7c which are adapted to cooperate with one of the rollers of each pair. Any preferred number of pairs of rollers can be employed but I prefer, as in the construction illustrated, to use three pairs as this gives a three-point support for the rings 7 and 8 and obviates difficulties incident to imperfect alignment of the parts. Between the rings 7 and 8 I preferably interpose a plurality of light plate springs 12, 12, as shown in Figs. 3, 4, 5 and 6. One spring for each pair of rollers 9 is suitable. Each spring 12 is preferably fitted with a positioning rivet or stud 12a which enters a hole in the edge of the ring structure 7, 7a, as shown in Fig. 6. From inspection of Fig. 3 it will be seen that circumferential movement of rings 7, 8 relative to the rollers 9, through the action of cams 7c on said rollers, will move ring 7 laterally toward ring 8, so as to compress the belt rib 1b between them. When the reverse relative movement occurs, the light springs 12 help to separate the rings 7 and 8 and restore them to their normal relative positions.

The band 8a carries a plurality of pairs (three in the construction illustrated) of fingers 13, 13 which are in a measure analogous to sprocket teeth because they are adapted to engage positively with the notches 2 of the belt. The two teeth 13 of each pair are secured to the ends of a resilient bar 14 which is preferably made of flat spring steel of the form shown in Figs. 7 and 8. The bar 14 is operatively secured to a pivot pin 15 by a bar 14a which is riveted to bar 14, the pivot 15 being carried by a bracket 16 which is riveted to the inner side of band 8a. The ring 7 and the bands 7a and 8a are formed with apertures 17, 17 through which the fingers 13 project to engage the belt 1. The fingers 13 of each pair are spaced apart such a distance that one finger is practically certain to engage the inner side of the rib of the belt while the other registers with one of the notches thereof, as shown in Fig. 7. This insures the operative engagement of one of the two fingers of each pair in a notch of the belt as the wheel rolls thereon, for if one of the fingers is not projected radially outward far enough to enter a notch of the belt the engagement of the other finger of the pair moves the bar 14 pivotally to so project the first finger. The ends of bar 14a are arranged to engage band 8a and limit the movement of fingers 13.

With one or more of the fingers 13 positively engaging notches of the belt, if the wheel rims slip on the belt, the rings 7 and 8 are held positively locked to the belt so that relative turning of the rings and the body of the wheel is insured, and this relative turning, through the action of the cams 7c, forces the rings 7 and 8 together.

Referring now more specifically to the construction of the belt, as shown in Figs. 9, 10 and 11, the web 1a of the belt is formed on its outer, ground-engaging side with a suitable ribbed tread. I prefer a tread construction comprising ribs 1a', 1a'', as illustrated, but any suitable form of rib construction can be employed. In each section of the rib 1b is imbedded a core 1b' which is preferably composed of compressed cork, which is lighter than the rubber and less compressible and resilient and yet has ample strength.

Both the web and the rib of the belt are reinforced by a series of cord or fabric layers imbedded and vulcanized in one with the rubber mass when the belt is made. The positions of the different reinforcing layers are indicated in Fig. 11 and the character of each layer is shown at the right side of Fig. 9. The two outermost layers 18 and 19 are in the form of longitudinal strips approximately half the width of the belt and consisting of longitudinaly extending cords or threads only. Next inside these cords is a strip 20 formed of diagonally extending cords or threads and nearly as wide as the belt. Next to the strip 20 comes a third, narrow strip 21 of longitudinally extending cords or threads, then a wide strip 22 of cords or threads extending diagonally at right angles to the cords of the strip 20, then another narrow strip 23 of longitudinally extending cords or threads. All of the foregoing reinforcing strips 18 to 23, inclusive, are disposed entirely within the web of the belt, but next inside the strip 23 are two full-width strips 24, 25 composed of diagonal cords or threads and extending at the middle of the belt down the sides of the rib sections thereof, as shown in Fig. 11. Next inside the strip 25 is a fabric strip 26 of intermediate width and next inside it a narrow fabric strip 27, both of the two fabric strips extending from the web of the belt down into the rib sections, as indicated. As indicated in Fig. 11, the cork core blocks 1b' are tapered inward to such an extent that the rubber cushion 1b'' between the strengthening strips and the core 1b' is considerably thicker at the inner sides of the rib sections than at their outer sides adjacent the web. This renders the rib sections more compressible and resilient at their inner thinner sides than at their outer sides adjacent the web of the belt.

On reference to Fig. 2 it will be noted that the taper or inclination of the sides of the belt rib is less than the inclination of the rings 7 and 8. Consequently, the first engagement between the belt rib sections and the rings 7 and 8 is effected at the inner, more resilient and compressible parts of the belt rib and full engagement with the belt rib is not effected until there has been some compression of the inner part of the rib, as will be readily understood. Similarly, the final or parting engagement of the rib with the wheel, as the belt leaves the wheel, is at the inner part of the rib. From a consideration of Figs. 9 and 11, it will be seen that the cord and fabric reinforcing strips provide very fully for the stresses and operating conditions to which such a belt is subjected in the case of endless belt tractors. The several narrow strips of longitudinally extending cords amply resist longitudinal stresses but are not of sufficient width to prevent a substantial amount of lateral or edgewise flexing of the belt which is desirable to facilitate the turning of the tractor without undue wear on the belt. The diagonal cord strips take diagonal stresses and, of course, do not materially oppose the lateral or edgewise flexing referred to. The narrower fabric strips are designed to take the heavy wear near the belt surfaces that are engaged by the wheels.

In Fig. 1 the belt 1 is shown as passing around an idler wheel 28 such as is employed in applying my improved belt drive to tractors, the wheel 3, in such case, being one of the two drive wheels of the tractor. Ordinarily additional smaller wheels, not shown, engage the lower run of the belt between the drive wheel and the idler wheel.

In the operation of the mechanism, assuming that the wheel 3 is driven by the rotation of the axle 6, the frictional engagement between the rim sections 4d of the wheel and the inner side of the belt are sufficient under ordinary conditions to prevent the wheel slipping on the belt. But when, under higher stresses, the wheel starts to slip on the belt, there is a resulting relative turning movement of the body and rim sections of the wheel in relation to the rings 7 and 8, these rings being locked together (insofar as relative circumferential movement is concerned) and in turn positively interlocked with the rib 1b of the belt by means of the fingers 13 which engage the notches 2 of the belt. As soon as this relative turning movement starts the rollers 9 on one side of the wheel by their engagement with the cam surfaces 7c force the ring 7 laterally toward the ring 8 so that said rings are caused to strongly grip the rib 1b of the belt and prevent further slipping of the wheel in relation to the belt. Obviously, the greater the driving stress between the wheel and the belt the greater will be the resultant gripping action of the rings 7 and 8 incident to the action of the rollers on the cams. As soon as the driving stresses are lessened the gripping of the belt rib is correspondingly eased off and the traction is again secured simply by the frictional engagement of the wheel rims 4d with the web of the belt. The easing off of the gripping action on the rib of the belt is insured by the natural resilience of the rib which tends by its expansion to again separate the rings 7 and 8, by the action of the light springs 12 which supplement the resilience of the belt rib and, finally, by the effect which results from the above described relative shaping of the belt rib and the rings 7 and 8. The last named effect is due to the fact that, as the drive wheel rolls on the belt, in the diametrically opposite regions where the circumferential and tangential sections of the belt meet, the inner parts of the belt rib sections move circumferentially more rapidly than the outer, web part of the belt, and to the further fact that the sections of the belt rib 1b have their initial and parting engagement with the wheel rings 7 and 8 at the inner side of the rib as previously described, the consequence of these two facts being that the frictional engagement of the inner side of the rib sections with the rings 7 and 8 tends to move the rings forward in relation to the body and rims of the wheel. This forward movement of the rings 7 and 8 relative to the wheel is in a direction to restore the cams 7c to their normal positions in relation to the rollers 9. In other words, the initial and parting engagements of the inner side of the belt rib with the rings 7 and 8 tend to effect a forward precession of said rings relative to the wheel and thus restore the rings to their normal relation to the wheel in which the belt rib is not strongly gripped.

Thus it will be seen that my improved mechanism provides an automatic friction drive, it being understood that the driving through the rib of the belt is made effective by the lateral gripping action of the rings 7 and 8 and not by the fingers or sprocket teeth 13, the latter being employed merely to insure movement of the rings 7 and 8 in unison with the belt when relative slippage between the latter and the wheel occurs. It is this action which I have previously referred to as the positive actuation of the belt-gripping mechanism.

It will be obvious from an inspection of the construction illustrated that the wheel, having its rim sections rigid with the body section has great strength and ruggedness. This feature of the wheel is made possible by providing a laterally movable belt-gripping member that is entirely independent of the sections of the wheel.

It will further be seen that the wheel comprises a relatively small number of parts, in fact the two discs 4, 4 with their anti-friction rollers are duplicates, the one of the other, and as the rims 4d, 4d are alike and the anti-friction rollers and their mountings are all alike, the number of different parts required for the wheel is very small indeed. The wheel 3, is light in weight, as well as strong.

While I have illustrated the construction preferred, it is to be understood that many changes and variations of the construction shown can be used without departing from the invention, the scope of which is indicated by the following claims.

What I claim is:

1. In a friction drive mechanism, the combination of a belt and a wheel over which the belt passes, said wheel comprising parts having tread surfaces to engage the inner side of the belt and lateral surfaces to engage opposite lateral surfaces of the belt, one of said wheel parts with lateral surfaces being mounted to turn circumferentially relative to the body of the wheel and said part and the belt having positive interlocking connection with each other causing them to move together circumferentially, and means operable by the said relative turning movement for causing the wheel parts with lateral surfaces to grip the belt.

2. In a friction drive mechanism, the combination of a notched belt and a wheel over which the belt passes, said wheel comprising parts having tread surfaces to engage the inner side of the belt and lateral surfaces to engage opposite lateral surfaces of the belt, one of said wheel parts with lateral surfaces being mounted to turn circumferentially relative to the body of the wheel and having positive connection with the notches of the belt to move circumferentially therewith, and means operable by the said relative turning movement for causing the wheel parts with lateral surfaces to grip the belt.

3. In a friction drive mechanism, the combination of a belt and a wheel over which the belt passes, said wheel having peripheral tread surfaces to engage the inner side of the belt and lateral surfaces to engage opposite lateral surfaces of the belt and said wheel comprising a body part, rim parts rigid with the body and formed with the said tread surfaces, a pair of circumferentially extending members formed with the said belt-engaging lateral surfaces and mounted to have a limited turning movement relative to the rim sections and the body of the wheel, and means operable by said relative turning movement to force said pair of members together to grip the belt.

4. In a friction drive mechanism, the combination of a belt formed on its inner side with a longitudinally extending rib and a wheel over which the belt passes and which has tread surfaces to engage the inner side of the belt and lateral surfaces to engage the sides of the rib of the belt, said wheel comprising a body, laterally turned rims rigid with the body and formed with the said tread surfaces, a pair of circumferentially extending members arranged to engage the opposite sides of the rib of the belt and adapted to have a limited turning movement relative to the wheel rims, and means operable by said relative turning movement to force said pair of members together to grip the rib of the belt.

5. In a friction drive mechanism, the combination of a belt formed on its inner side with a longitudinally extending rib, a wheel over which the belt passes and which has tread surfaces engaging the inner side of the belt and lateral surfaces engaging the sides of the rib of the belt, said wheel having a body comprising two webs, laterally extending rims rigid with the body webs and formed with the said tread surfaces, a pair of rings arranged between said webs in engagement with the sides of the rib of the belt, a plurality of rollers mounted on the webs and affording bearing support for the said rings, and devices for forcing said rings together to grip the rib of the belt when relative movement occurs between said rings and the rims of the wheel.

6. In a friction drive mechanism, the combination of a notched belt and a wheel over which the belt passes, said wheel comprising parts having tread surfaces to engage the inner side of the belt and lateral surfaces to engage opposite lateral surfaces of the belt, one of said wheel parts with lateral surfaces being mounted to turn circumferentially relative to the body of the wheel, means operating automatically to effect positive interlocking connection between the last named part and the notches of the belt, and means operable by the said relative turning movement for causing the wheel parts with lateral surfaces to grip the belt.

7. In a friction drive mechanism, the combination of a notched belt and a wheel over which the belt passes, said wheel comprising parts having tread surfaces to engage the inner side of the belt and lateral surfaces to engage opposite lateral surfaces of the belt, one of said wheel parts with lateral surfaces being mounted to turn circumferentially relative to the body of the wheel, a plurality of interconnected movably mounted dogs on said last named part arranged so that one dog will always engage the belt between notches and force one of the other dogs into a notch, so as to positively interconnect the said relatively turnable wheel part and the belt, and means operable by the said relative turning movement for causing the wheel parts with lateral surfaces to grip the belt.

In testimony whereof, I hereunto affix my signature.

GORDON R. PENNINGTON.